US012792886B2

(12) United States Patent
Gregor et al.

(10) Patent No.: US 12,792,886 B2
(45) **Date of Patent: *Nov. 10, 2026**

(54) RECURRENT NEURAL NETWORKS FOR DATA ITEM GENERATION

(71) Applicant: GDM Holding LLC, Mountain View, CA (US)

(72) Inventors: Karol Gregor, London (GB); Ivo Danihelka, London (GB)

(73) Assignee: GDM Holding LLC, Mountain View, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 18/367,305

(22) Filed: Sep. 12, 2023

(65) Prior Publication Data

US 2023/0419076 A1 Dec. 28, 2023

Related U.S. Application Data

(63) Continuation of application No. 17/384,280, filed on Jul. 23, 2021, now Pat. No. 11,790,209, which is a (Continued)

(51) Int. Cl.
*G06N 3/0455* (2023.01)
*G06N 3/0442* (2023.01)
(Continued)

(52) U.S. Cl.
CPC ......... *G06N 3/0455* (2023.01); *G06N 3/0442* (2023.01); *G10L 13/02* (2013.01); *G10L 25/30* (2013.01)

(58) Field of Classification Search
CPC .... G06N 3/0455; G06N 3/0442; G06N 3/044; G06N 3/045; G06N 3/0475; G06N 3/0895; G10L 13/02; G10L 25/30
(Continued)

(56) References Cited

U.S. PATENT DOCUMENTS

| | | | |
|---|---|---|---|
| 5,720,002 | A | 2/1998 | Wang et al. |
| 6,526,167 | B1 | 2/2003 | Numaoka |

(Continued)

FOREIGN PATENT DOCUMENTS

| | | |
|---|---|---|
| CN | 1100541 | 3/1995 |
| CN | 1463215 | 12/2003 |

(Continued)

OTHER PUBLICATIONS

Cho et al., "Learning Phrase Representations using RNN Encoder-Decoder for Statistical Machine Translation," Proceedings of the 2014 Conference on Empirical Methods in Natural Language Processing, Oct. 2014, 11 pages.

(Continued)

*Primary Examiner* — Amare F Tabor
(74) *Attorney, Agent, or Firm* — Fish & Richardson P.C.

(57) ABSTRACT

Methods, and systems, including computer programs encoded on computer storage media for generating data items. A method includes reading a glimpse from a data item using a decoder hidden state vector of a decoder for a preceding time step, providing, as input to a encoder, the glimpse and decoder hidden state vector for the preceding time step for processing, receiving, as output from the encoder, a generated encoder hidden state vector for the time step, generating a decoder input from the generated encoder hidden state vector, providing the decoder input to the decoder for processing, receiving, as output from the decoder, a generated a decoder hidden state vector for the time step, generating a neural network output update from the decoder hidden state vector for the time step, and combining the neural network output update with a current neural network output to generate an updated neural network output.

20 Claims, 4 Drawing Sheets

Related U.S. Application Data continuation of application No. 15/016,160, filed on Feb. 4, 2016, now Pat. No. 11,080,587.

(60) Provisional application No. 62/113,338, filed on Feb. 6, 2015.

(51) Int. Cl.
*G10L 13/02* (2013.01)
*G10L 25/30* (2013.01)

(58) Field of Classification Search
USPC .............................................. 706/27; 726/27
See application file for complete search history.

(56) References Cited

U.S. PATENT DOCUMENTS

| | | | | |
|---|---|---|---|---|
| 6,591,235 | B1 | 7/2003 | Chen et al. | |
| 6,636,216 | B1 | 10/2003 | Silverbrook et al. | |
| 6,832,214 | B1 * | 12/2004 | Nguyen | G06F 8/41 717/148 |
| 7,321,882 | B2 * | 1/2008 | Jaeger | G06N 3/0495 706/30 |
| 2008/0046249 | A1 | 2/2008 | Thyssen et al. | |
| 2012/0036097 | A1 | 2/2012 | Prokhorov | |
| 2013/0311412 | A1 | 11/2013 | Lazar et al. | |
| 2014/0358265 | A1 | 12/2014 | Wang et al. | |

FOREIGN PATENT DOCUMENTS

| | | |
|---|---|---|
| CN | 104050507 | 9/2014 |
| CN | 104335232 | 2/2015 |

OTHER PUBLICATIONS

CN Office Action in Chinese Appln. No. 201610139237.7, dated Jul. 3, 2020, 11 pages, (with English translation).

CN Office Action in Chinese Appln. No. 201610139237.7, dated Mar. 30, 2021, 17 pages (with English translation).

Discriminative deep belief networks for visual data classification': Liu, 2011, pattern recognition, 2011, pp. 2287-2296.

Elements of artificial neural networks': Mehrotra, 1997, MIT press.

EP Summons to attend oral proceedings pursuant to Rule 115(1) EPC in European Appln No. 17207386.8, dated Feb. 21, 2020, 8 pages.

Extended European Search Report in Application No. 16154406.9-1910/3054403, mailed on Nov. 9, 2016, 9 pages.

Extended European Search Report issued in Application No. 17207386.8, mailed on Jan. 23, 2018, 9 pages.

Graves et al., "Neural turing machines," arXiv preprint arXiv:1410.5401, Dec. 2014, pp. 1-26.

Graves, "Generating sequences with recurrent neural networks," arXiv preprint arXiv:1308.0850, Aug. 2013, pp. 1-43.

Gregor et al., "DRAW: a Recurrent Neural Network for Image Generation," Feb. 2015, 10 pages.

Gregor et al., "Deep autoregressive networks," In Proceedings of the 31st International Conference on Machine Learning, May 2014, 9 pages.

Jian-ling et al., "Research and Prospect of Deep Autoencoders," Computers and Modernization, Aug. 2014, 15(8):128 (English abstract).

Mnih et al., "Recurrent models of visual attention," In Advances in Neural Information Processing Systems, Jun. 2014, pp. 2204-2212.

Notice of Allowance issued in European Application No. 16154406.9, mailed on Jan. 5, 2018, 2 pages.

Ranzato, "On learning where to look," arXiv preprint arXiv:1405.5488, Apr. 2014, pp. 1-14.

Reconstruction of Handwritten Digit Images Using Autoencoder Neural Networks Tan, 2008, IEEE, 978-1-4244-1643.

Tieleman, "Optimizing Neural Networks that Generate Images," PHD thesis, University of Toronto, 2014, 120 pages.

Notice of Allowance in Chinese Appln. No. 202110924961.1, dated Mar. 1, 2024, 7 pages (with English translation).

Peng-Hua et al., "Quantum Gate Elman Neural Network and Its Quantized Extended Gradient Back-propagation Training Algorithm," Acta Automatica Sinica, Sep. 2013, 39(9):1511-1522 (with English abstract).

* cited by examiner

RECURRENT NEURAL NETWORKS FOR DATA ITEM GENERATION

CROSS-REFERENCE TO RELATED APPLICATION

This application is a continuation of U.S. application Ser. No. 17/384,280, filed Jul. 23, 2021, which is a continuation of U.S. application Ser. No. 15/016,160, filed on Feb. 4, 2016, now U.S. Pat. No. 11,080,587, which claims priority to U.S. Provisional Application No. 62/113,338, filed on Feb. 6, 2015. The disclosures of the prior applications are considered part of and are incorporated by reference in the disclosure of this application.

BACKGROUND

This specification relates to processing inputs through the layers of recurrent neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in systems that include an encoder neural network, wherein the encoder neural network is a recurrent neural network that is configured to, for each input data item processed by the encoder neural network and at each time step of a plurality steps: receive a glimpse captured by reading from the input data item, receive a decoder hidden state vector of a decoder neural network for the preceding time step, and process the glimpse, the decoder hidden state vector, and an encoder hidden state vector of the encoder neural network from the preceding time step to generate an encoder hidden state vector for the time step; a decoder neural network, wherein the decoder neural network is a recurrent neural network that is configured to, for each of the plurality of time steps: receive a decoder input for the time step, and process the decoder hidden state vector for the preceding time step and the decoder input to generate a decoder hidden state vector for the time step; and a subsystem, wherein the subsystem is configured to, for each of the time steps: read the glimpse from the input data item using the decoder hidden state vector for the preceding time step; provide the glimpse as input to the encoder neural network; generate the decoder input for the decoder neural network from the encoder hidden state vector at the time step; provide the decoder input as input to the decoder neural network for the time step; generate a neural network output update for the time step from the decoder hidden state vector for the time step; and combine the neural network output update for the time step with a current neural network output to generate an updated neural network output.

Other embodiments of this aspect include computer programs recorded on one or more computer storage devices configured to cause one or more computers to implement the system and methods that include the operations performed by the subsystem. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages.

A system implementing a deep recurrent attentive writer neural network architecture for data item generation combines a spatial attention mechanism that mimics the foveation of the human eye with a sequential variational auto-encoding framework that enables an iterative construction of complex images. The system may be used to generate high quality images, e.g., highly realistic natural images that cannot be distinguished from real data with the naked eye.

A system implementing a deep recurrent attentive writer neural network architecture applies a natural form of image construction in which parts of a scene are created independently from others and approximate sketches are successively refined, unlike standard systems that automatically generate images by generating entire scenes in a single pass at once, e.g., generative neural networks that condition pixels on a single latent distribution. A system implementing a deep recurrent attentive writer neural network architecture therefore does not preclude the possibility of iterative self-correction, improving the accuracy and quality of constructed images. Furthermore, by applying a natural form of image construction a system implementing a deep recurrent attentive writer neural network architecture may be easily scalable to large images, unlike standard systems that do not include a deep recurrent attentive writer neural network architecture.

By iteratively constructing scenes through an accumulation of modifications emitted by a decoder included in the architecture, each of which is observed by an encoder included in the architecture, the system implementing a deep recurrent attentive writer neural network architecture may selectively attend to particular parts of a scene whilst ignoring others, thus improving the visual structure of a constructed image. In addition, the system may learn where to look when performing a sequence of partial glimpses since, unlike other systems that implement sequential attention models, a deep recurrent attentive writer neural network model is fully differentiable and may be trained with standard backpropagation techniques. For example, in some cases the system may parameterize a latent variable distribution that is a diagonal Gaussian distribution which enables a gradient of a function of latent variable samples with respect to distribution parameters to be easily obtained using standard techniques such as a reparameterization trick, in turn enabling straightforward backpropagation of unbiased, low variance stochastic gradients of a loss function through the latent distribution.

As well as being applied to image generation tasks, the attention mechanism embedded in a system implementing a deep recurrent attentive writer neural network architecture may further be applied to image classification tasks, image inpainting paintings, speech generation tasks, or image segmentation tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
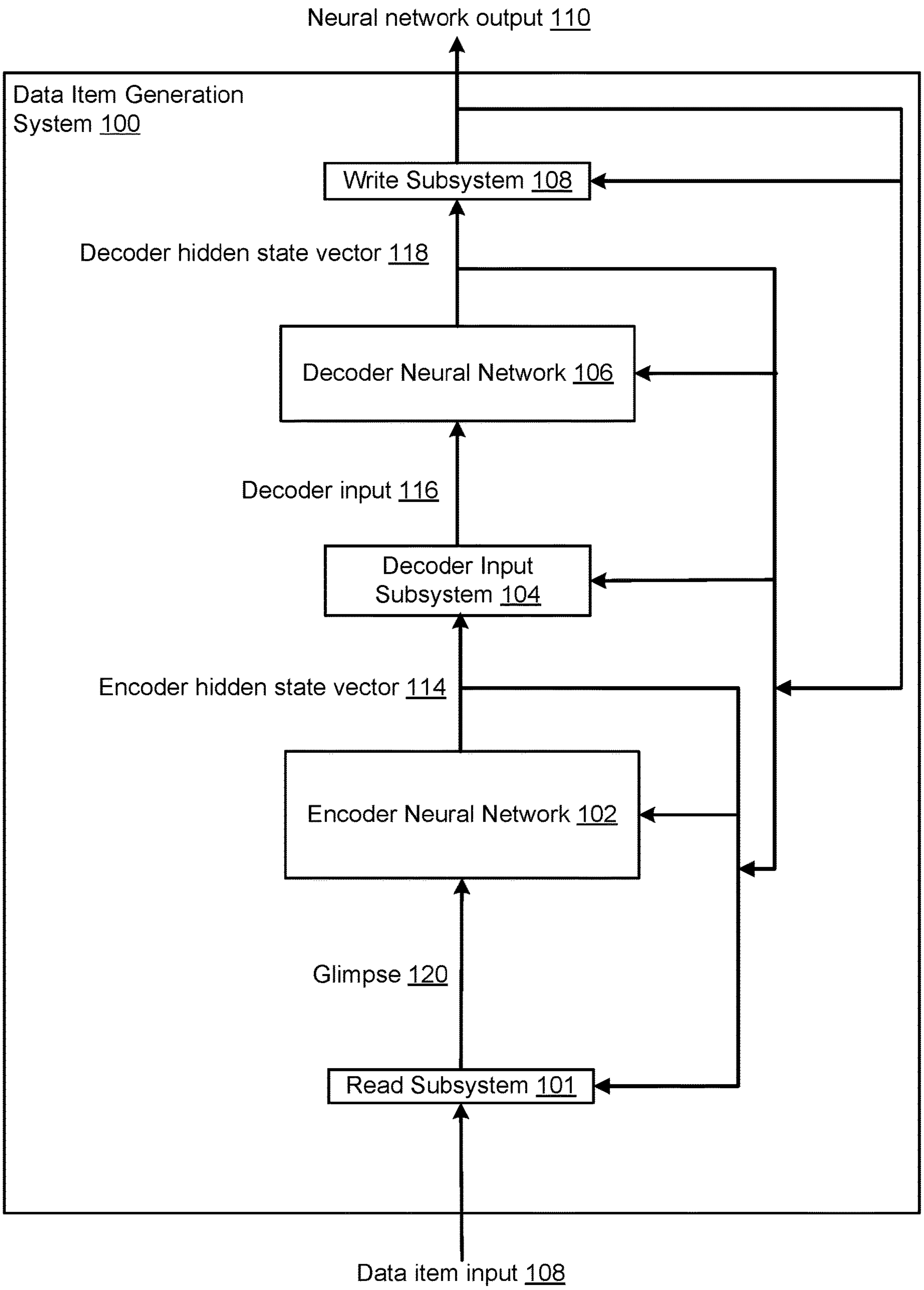
FIG. 1 shows an example data item generation system.

FIG. 1 shows an example data item generation system 100 for generating neural network outputs. The data item generation system 100 is an example of a system implemented as computer programs on one or more computers in one or more locations, in which the systems, components, and techniques described below can be implemented.

The data item generation system 100 obtains input data items and processes the input data items to generate a respective neural network output for each input data item, e.g., a neural network output 110 for a data item 108. The generated neural network output for a given input data item may be a reconstructed version of the input data item or canvas matrices that may in turn be used to reconstruct the input data items. For example, the input data items, e.g., input data item 108, may be images or frames from videos and the generated neural network output may be a reconstructed image or a reconstruction of the video frame by frame. The input data items are provided to the data item generation system 100 and read at each time step in a sequence of time steps. The number of time steps in the sequence of time steps may be considered a free parameter to be specified in advance.

The data item generation system 100 includes a read subsystem 101, an encoder neural network 102, a decoder input subsystem 104, a decoder neural network 106, and a write subsystem 108. The encoder neural network 102 compresses data items received during training, and the decoder neural network 106 reconstitutes data items after receiving codes. The components of the data item generation system 100 may be trained end-to-end using standard training techniques, e.g., stochastic gradient descent methods with appropriate loss functions.

The encoder neural network 102 and the decoder neural network 106 are recurrent neural networks that, at each of the time steps, receive a respective input and use the input to update a respective hidden state of the neural network. In some implementations, the encoder neural network 102 and the decoder neural network 106 are long short-term memory (LSTM) neural networks that include one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network 110. An example LSTM neural network is described in more detail in "Generating sequences with recurrent neural networks," Alex Graves, available at http://arxiv.org/abs/1308.0850v5. In this specification, the hidden state of the encoder neural network 102 will be referred to as the encoder hidden state and the hidden state of the decoder neural network 106 will be referred to as the decoder hidden state.

The read subsystem 101 receives a data item input, e.g., data item input 108, and, at each time step in the sequence of time steps, reads a glimpse from the input data input item using a decoder hidden state vector for the preceding time step. The decoder hidden state vector for the preceding time step specifies which part of the data input item the read subsystem 101 should read and, in turn, restricts the input region of the input data item observed by the encoder neural network 102. The read subsystem 101 provides the glimpse as input to the encoder neural network 102.

At each time step in the sequence of time steps, the decoder input subsystem 104 generates a decoder input, e.g., decoder input 116, using an encoder hidden state vector for the time step, e.g., encoder hidden state vector 114, and provides the generated decoder input for the time step to the decoder neural network 106 as the input to the decoder neural network 106 at the time step.

At each time step in the sequence of time steps, the write subsystem 108 further generates a neural network output update for the time step using the decoder hidden state vector for the time step, e.g., decoder hidden state vector 118, and combines the neural network output update with a current neural network output to generate an updated neural network output. For example, the write subsystem 108 may be configured to add the neural network output update via a write operation to a cumulative canvas matrix that is used to reconstruct a data item. The updated neural network output after the last time step may be considered to be the neural network output for the input data item. Generating an updated neural network output from an input data item is described in more detail below with reference to FIG. 2.

In some implementations the data item generation system 100 may train the encoder neural network 102 and the decoder neural network 104 to autoencode input data items. For example, the data item generation subsystem 100 may train the encoder neural network 102 and decoder neural network 106 to generate an updated neural network output 110 that is a reconstruction of the input data item 108.

At each time step in the sequence of time steps the encoder neural network 102 receives as input a glimpse, e.g., glimpse 120, captured by reading from an input data item x, e.g., input data item 108, and a decoder hidden state vector of the decoder neural network 106 for the preceding time step. The encoder neural network 102 processes the glimpse 120, preceding decoder hidden state vector and an encoder hidden state vector of the encoder neural network 102 from the preceding time step to generate an updated encoder hidden state vector, e.g., encoder hidden state vector 114. Processing a glimpse using an encoder neural network is described in more detail below with reference to FIG. 3.

At each time step in the sequence of time steps the decoder neural network 106 receives an input decoder input, e.g., decoder input 116. The decoder neural network 106 processes the decoder input 116 and the decoder hidden state vector for the preceding time step, to generate a decoder hidden state vector for the time step, e.g., decider hidden state vector 118. Processing a decoder input using a decoder neural network is described in more detail below with reference to FIG. 4.

Once the components have been trained, the data item generation system 100 can use the decoder neural network 106 without using the encoder neural network 102 for a data generation task. For example, an image may be generated by iteratively selecting latent variable samples from a prior and running the decoder neural network 106 to update a canvas matrix. After a fixed number of repetitions of this process, the data item generation system 100 can output the final canvas matrix as a newly generated image.

Figure 2:
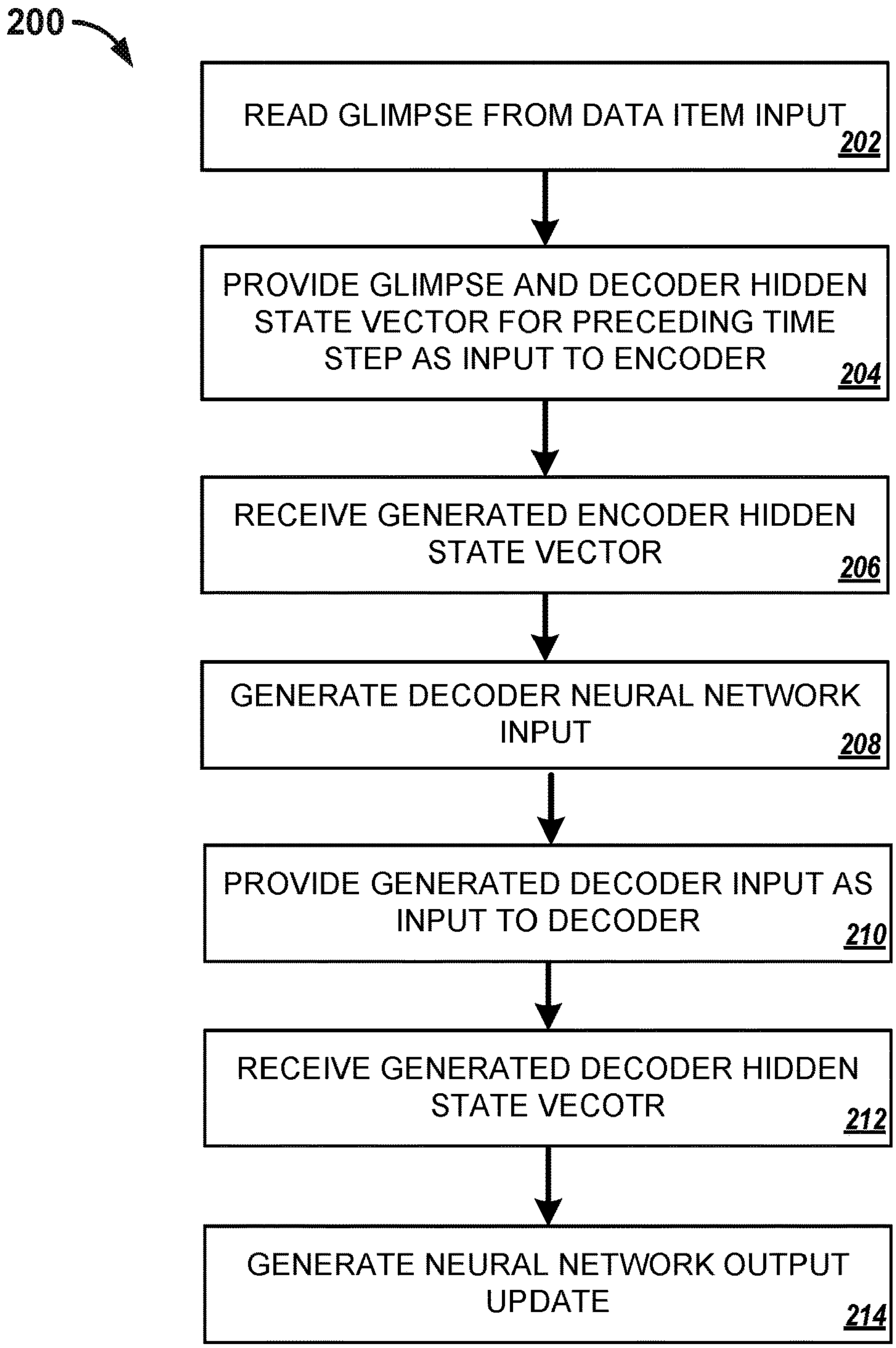
FIG. 2 is a flow diagram of an example process for generating an updated neural network output.

FIG. 2 is a flow diagram of an example process 200 for generating an updated neural network output from a data item input at a given time step. For convenience, the process 300 will be described as being performed by a system of one or more computers located in one or more locations. For example, a data item generation system including an encoder neural network and a decoder neural network, e.g., the data item generation system 100 of FIG. 1, appropriately programmed, can perform the process 300.

The system reads a glimpse from the input data item x at time step t using a decoder hidden state vector of the decoder neural network for the preceding time step t−1 (step 202). The hidden state vector of the decoder neural network for the preceding time step specifies where the system should read at each time step. In some implementations the system may further use the encoder hidden state vector for preceding time steps to read a glimpse from the input data item.

In some implementations the input data item x is an image and the glimpse captured by the system by reading from the input data item is an image patch. The image patch may be generated by applying an array of Gaussian filters to the image, where the parameters for applying the array of Gaussian filters are generated by applying a linear transformation to the decoder hidden state vector for the preceding time step. For example, a two-dimensional form of attention may be used where an array of 2D Gaussian filters is applied to the image, yielding an image patch of smoothly varying location and zoom. In other implementations the input data item is a video. In further implementations the input data item is a speech fragment or features of a speech fragment.

The system provides, as input to the encoder neural network, the (i) glimpse and (ii) decoder hidden state vector for the preceding time step for processing (step 204). The precise form of the input provided to the encoder neural network depends on the read operation executed above in step 202. Since the encoder is privy to the decoder's previous output, the encoder is able to tailor the codes it sends according to the decoder's behavior so far. Processing a glimpse and decoder hidden state vector through an encoder neural network is described in more detail below with reference to FIG. 3.

The system receives, as output from the encoder neural network, a generated encoder hidden state vector for the time step (step 206). The output of the encoder neural network may be used to compute an approximate posterior over latent variables at the time step t, e.g., the output $$h_t^{enc}$$

of the encoder may be used to parameterize a distribution $$Q(z_t \mid h_t^{enc})$$

over the latent variable vector $z_t$. In some implementations the latent distribution is a diagonal Gaussian distribution.

In some implementations the system provides the encoder hidden state vectors from the time step for a particular data item as features of the particular data item, where the features of the particular data item are provided for use in processing the particular data item during a semi-supervising learning procedure.

The system generates a decoder input for the decoder neural network from the generated encoder hidden state vector at the time step (step 208). In some implementations the system may generate the decoder input for the decoder neural network from the encoder hidden state vector at the time step by using the encoder hidden state vector for the time step to parameterize a distribution of a latent vector and sampling the decoder input from the distribution. For example, the system may draw a sample $$z_t \sim Q(z_t|h_t^{enc})$$

from the latent distribution $$Q(z_t|h_t^{enc})$$

described above with reference to step 206. The encoder hidden state vector for the time step $$h_t^{enc},$$

and hence the latent distribution $$Q(z_t|h_t^{enc}),$$

depend on both the input data item x and the history of previous latent samples $z_{1:t-1}$.

The system provides, as input to the decoder neural network, the decoder input for processing (step 210). Processing a decoder input using a decoder neural network is described in more detail below with reference to FIG. 4.

The system receives, as output from the decoder neural network, a generated a decoder hidden state vector for the time step (step 212). The generated decoder hidden state vector for the time step may be stored and/or provided to the encoder neural network at a later time step, e.g., the next time step t+1 in the sequence of time steps. The encoder neural network is therefore privy to the decoder's previous outputs, allowing the encoder neural network to tailor the codes it sends according to the decoder's behavior so far.

The system generates a neural network output update for the time step from the decoder hidden state vector for the time step (step 214) and combines the neural network output update with the neural network output from the preceding time step to generate an updated neural network output. Thus, the decoder outputs may be successively added to a distribution that may be used to generate system output data, rather than emitting the distribution in a single step. For example, the system may generate a write from the output of the decoder neural network using a write operation and add the write to a cumulative canvas matrix $c_{t-1}$ through a write operation, e.g., by modifying part of the cumulative matrix to generate a current cumulative canvas matrix $c_t$.

In particular, for images, the system generates the data to be written by extracting a set of attention parameters from the decoder hidden state vector and applying the attention parameters to the decoder hidden state vector in order to generate a writing image patch.

In some implementations the system may cause the decoder neural network to process a sequence of inputs sampled from a prior distribution to generate a new neural network output, wherein the data items are images, and wherein the new neural network output is a new image generated by the decoder neural network. For example, the system may use the modified cumulative canvas matrix at a final time T to reconstruct the image. The total number of time steps T consumed by the network may be a free parameter that can be specified in advance of performing the process 200.

The final canvas matrix $c_T$ may be used to parameterize a model of the input data. For example, if the input data is binary, the final canvas matrix may be used to parameterize a Bernoulli distribution. The parameterized model may be used to determine a total loss function for the network that describes the expected compression of the data by the decoder and prior.

Figure 3:
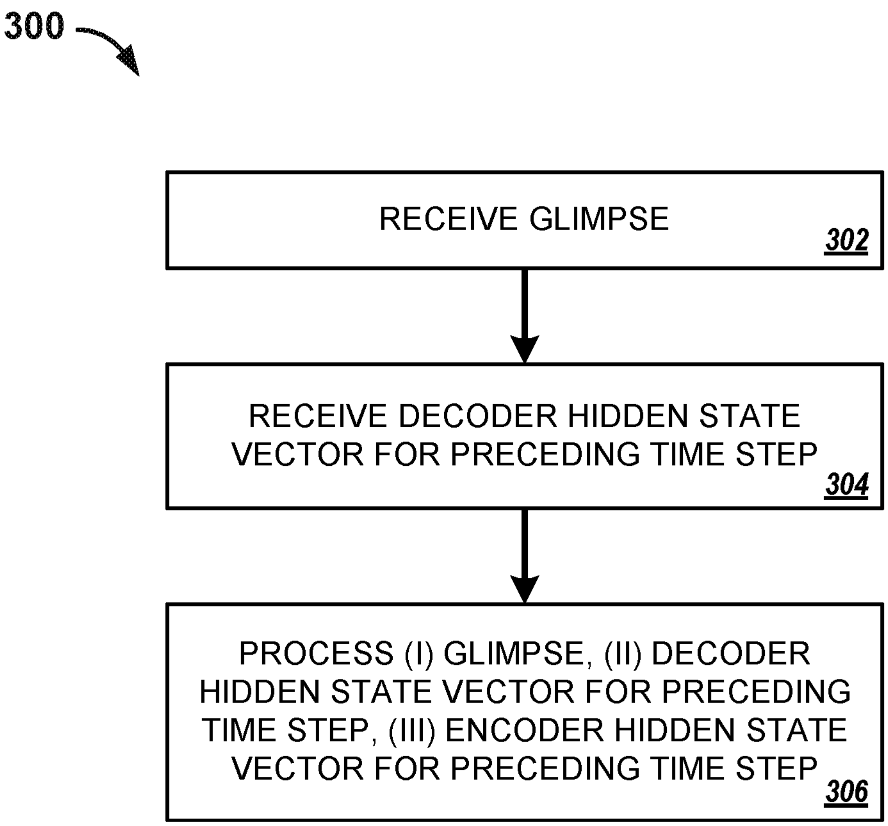
FIG. 3 is a flow diagram of an example process for processing a glimpse using a encoder neural network.

FIG. 3 is a flow diagram of an example process 300 for processing a glimpse using an encoder neural network. For convenience, the process 300 will be described as being performed by a system of one or more computers located in one or more locations. For example, a data item generation system including an encoder neural network, e.g., the encoder neural network 102 of FIG. 1, appropriately programmed, can perform the process 300.

The system receives a glimpse captured by reading from the input data item (step 302). In some implementations the data item generation system may not employ an attention model and the entire image may be provided to the encoder neural network at each time step. In other implementations the system may employ a selective attention model. For example, as described above with reference to FIG. 2, the system may apply an array of Gaussian filters to an image yielding an image patch of smoothly varying location and zoom. In further implementations the system may employ a reading with attention model, for example by concatenating two image patches from a received image and an error image. In this case the same filterbanks may be used for both the image and error image.

The system receives a decoder hidden state vector of a decoder neural network for the preceding time step (step 304). By receiving the decoder hidden state vector of the decoder neural network for a preceding time step the encoder neural network is able to tailor the codes it sends according to the decoder's behavior so far.

The system processes the glimpse, the decoder hidden state vector, and an encoder hidden state vector of the encoder neural network from the preceding time step using the encoder neural network to update the encoder hidden state vector, i.e., to generate an encoder hidden state vector for the time step (step 306). The system may provide the generated encoder hidden state vector for the time step to a subsystem for processing, e.g., for use in generating a decoder neural network input, as described above with reference to FIG. 2.

Figure 4:
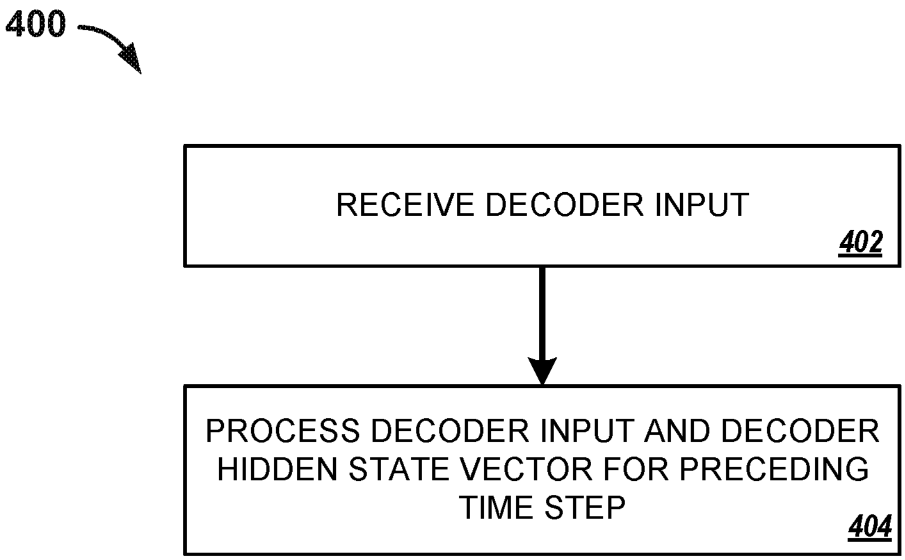
FIG. 4 is a flow diagram of an example process for processing a decoder input using decoder neural network.

FIG. 4 is a flow diagram of an example process 400 for processing a decoder input using decoder neural network. For convenience, the process 400 will be described as being performed by a system of one or more computers located in one or more locations. For example, a decoder neural network, e.g., the decoder neural network 106 of FIG. 1, appropriately programmed, can perform the process 400.

The system receives a decoder input for the time step (step 402).

The system processes the decoder hidden state vector for the preceding time step and the decoder input using a decoder neural network to update the decoder hidden state vector, i.e., to generate a decoder hidden state vector for the time step (step 404).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for generating a final output image, comprising:

repeatedly updating a neural network output at each of a plurality of time steps to generate a final neural network output, the updating comprising, for each of the time steps:

generating a decoder input for a decoder neural network for the time step, wherein the decoder neural network is configured to, for each of the time steps, receive the decoder input for the time step, and process a decoder hidden state vector for a preceding time step and the decoder input to generate a decoder hidden state vector for the time step;

processing the decoder input for the time step using the decoder neural network to generate the decoder hidden state vector for the time step;

generating a neural network output update for the time step from the decoder hidden state vector for the time step; and combining the neural network output update for the time step with a current neural network output to generate an updated neural network output; and generating the final output image from the final neural network output.

2. The method of claim 1, wherein generating the decoder input for the decoder neural network comprises selecting latent variable samples from a prior distribution.

3. The method of claim 1, wherein the updated neural network outputs are images, and wherein the updated neural network output for a last time step in the plurality of time steps is a new image.

4. The method of claim 1, wherein the updated neural network outputs define distributions of images, and wherein the updated neural network output for a last time step in the plurality of time steps defines a distribution that is used to parameterize a distribution model of the final output image.

5. The method of claim 1, wherein generating the neural network output update for the time step from the decoder hidden state vector for the time step comprises:

applying a write operation to the decoder hidden state vector for the time step to generate the neural network output update for the time step.

6. The method of claim 5, wherein applying the write operation comprises:

generating a set of attention parameters for the time step from the decoder hidden state vector for the time step; and applying the set of attention parameters to the decoder hidden state vector for the time step to generate the neural network output update for the time step.

7. The method of claim 1, wherein the neural network output update is a writing image patch.

8. The method of claim 1, comprising, for each of the time steps:

reading a glimpse from an input image using a decoder hidden state vector of the decoder neural network for a preceding time step;

providing, as input to an encoder neural network, the (i) glimpse and (ii) the decoder hidden state vector for the preceding time step for processing;

receiving, as output from the encoder neural network, an encoder hidden state vector for the time step; and generating the decoder input for the decoder neural network from the encoder hidden state vector at the time step.

9. The method of claim 8, wherein generating the decoder input for the decoder neural network from the encoder hidden state vector for the time step comprises:

using the encoder hidden state vector for the time step to parameterize a distribution of a latent vector; and sampling the decoder input from the distribution.

10. The method of claim 8, wherein the encoder neural network and the decoder neural network have been trained to autoencode input images.

11. A system comprising one or more computers and one or more storage devices storing instructions that when executed by the one or more computers cause the one or more computers to perform operations comprising:

repeatedly updating a neural network output at each of a plurality of time steps to generate a final neural network output, the updating comprising, for each of the time steps:

generating a decoder input for a decoder neural network for the time step, wherein the decoder neural network is configured to, for each of the time steps, receive the decoder input for the time step, and process a decoder hidden state vector for a preceding time step and the decoder input to generate a decoder hidden state vector for the time step;

processing the decoder input for the time step using the decoder neural network to generate the decoder hidden state vector for the time step;

generating a neural network output update for the time step from the decoder hidden state vector for the time step; and combining the neural network output update for the time step with a current neural network output to generate an updated neural network output; and generating a final output image from the final neural network output.

12. The system of claim 11, wherein generating the decoder input for the decoder neural network comprises selecting latent variable samples from a prior distribution.

13. The system of claim 12, wherein the updated neural network outputs are images, and wherein the updated neural network output for a last time step in the plurality of time steps is a new image.

14. The system of claim 12, wherein the updated neural network outputs define distributions of images, and wherein the updated neural network output for a last time step in the plurality of time steps defines a distribution that is used to parameterize a distribution model of the final output image.

15. The system of claim 12, wherein generating the neural network output update for the time step from the decoder hidden state vector for the time step comprises:

applying a write operation to the decoder hidden state vector for the time step to generate the neural network output update for the time step.

16. The system of claim 15, wherein applying the write operation comprises:

generating a set of attention parameters for the time step from the decoder hidden state vector for the time step; and applying the set of attention parameters to the decoder hidden state vector for the time step to generate the neural network output update for the time step.

17. The system of claim 11, wherein the neural network output update is a writing image patch.

18. The system of claim 11, the operations comprise, for each of the time steps:

reading a glimpse from an input image using a decoder hidden state vector of the decoder neural network for a preceding time step;

providing, as input to an encoder neural network, the (i) glimpse and (ii) the decoder hidden state vector for the preceding time step for processing;

receiving, as output from the encoder neural network, an encoder hidden state vector for the time step; and generating the decoder input for the decoder neural network from the encoder hidden state vector at the time step.

19. The system of claim 18, wherein generating the decoder input for the decoder neural network from the encoder hidden state vector for the time step comprises:

using the encoder hidden state vector for the time step to parameterize a distribution of a latent vector; and sampling the decoder input from the distribution.

20. One or more non-transitory computer-readable storage media storing instructions that when executed by one or more computers cause the one or more computers to perform operations comprising:

repeatedly updating a neural network output at each of a plurality of time steps to generate a final neural network output, the updating comprising, for each of the time steps:

generating a decoder input for a decoder neural network for the time step, wherein the decoder neural network is configured to, for each of the time steps, receive the decoder input for the time step, and process a decoder hidden state vector for a preceding time step and the decoder input to generate a decoder hidden state vector for the time step;

processing the decoder input for the time step using the decoder neural network to generate the decoder hidden state vector for the time step;

generating a neural network output update for the time step from the decoder hidden state vector for the time step; and combining the neural network output update for the time step with a current neural network output to generate an updated neural network output; and generating a final output image from the final neural network output.

* * * * *